T. C. WILLETT.
ACCELERATOR FOR INTERNAL COMBUSTION ENGINES.
APPLICATION FILED OCT. 18, 1911.
1,049,959.
Patented Jan. 7, 1913.
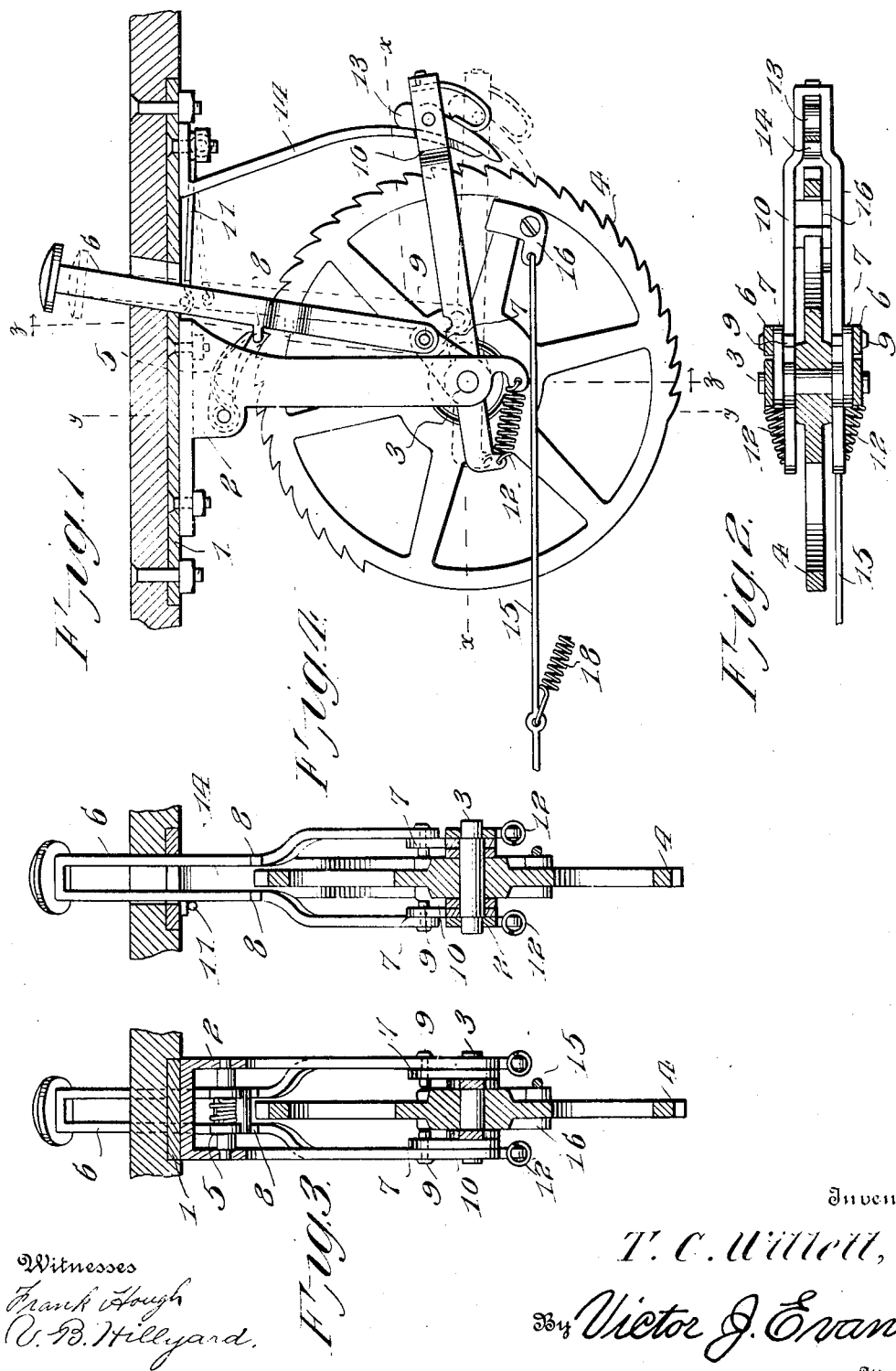
Witnesses
Frank Hough
O. B. Hillyard
Inventor
T. C. Willett,
By Victor J. Evans
Attorney

UNITED STATES PATENT OFFICE.

THOMAS C. WILLETT, OF ADAMS, TENNESSEE.

ACCELERATOR FOR INTERNAL-COMBUSTION ENGINES.

1,049,959.     Specification of Letters Patent.     Patented Jan. 7, 1913.

Application filed October 18, 1911. Serial No. 655,316.

*To all whom it may concern:*

Be it known that I, THOMAS C. WILLETT, a citizen of the United States, residing at Adams, in the county of Robertson and State of Tennessee, have invented new and useful Improvements in Accelerators for Internal-Combustion Engines, of which the following is a specification.

The advantages of an accelerator in the driving of vehicles propelled by explosive engines are manifold, hence the desirability of equipping automobiles with such throttle controlling means. The ordinary accelerator requires the operator of the machine to hold the foot in a given position, thereby producing cramp, fatigue and discomfort to the operator on long trips besides making it extremely difficult to maintain the foot lever at the required position, particularly when driving over rough roads. These disadvantages are attributable to the fact that the foot must be held at a given angle with no support other than that provided by the extreme rear portion of the heel.

The present invention provides an accelerator which may be operated and held at the required position while at the same time enabling the foot of the operator to rest squarely upon the floor of the machine, this being due to the fact that the accelerator mechanism is adapted to be operated by stages and held at any adjusted position when the foot rests squarely upon the floor of the car.

The invention consists of the novel features, details of construction and combination of parts, which hereinafter will be more particularly set forth, illustrated in the accompanying drawing, and pointed out in the appended claims.

Referring to the drawing, forming a part of the specification, Figure 1 is a view in elevation of an accelerator for explosive engines embodying the invention. Fig. 2 is a horizontal section on the line *x—x* of Fig. 1. Fig. 3 is a vertical section on the line *y—y* of Fig. 1. Fig. 4 is a section on the line *z—z* of Fig. 1, looking in the direction of the arrow.

Corresponding and like parts are referred to in the following description, and indicated in all the views of the drawing, by the same reference characters.

The accelerator mechanism is mounted upon a suitable base 1, which usually consists of a plate adapted to be bolted or otherwise fastened to a convenient part of the car to admit of the push bar being within convenient reach of the foot of the operator. A bracket 2 is secured or otherwise provided upon the base 1 and supports an axle 3 to which is secured a ratchet wheel 4. The bracket 2 has portions extending upon opposite sides of the ratchet wheel 4 so as to receive the ends of the axle 3. A dog 5 pivotally connected to the bracket 2 is adapted to engage the teeth of the ratchet wheel 4 and prevent backward rotation thereof. The push bar 6 is mounted in the base 1 and its lower end is forked and embraces opposite sides of the ratchet wheel 4 and is connected by means of links 7 to the axle 3. The push bar 6 has a stop 8 which is adapted to engage the end of the dog 5 to normally hold said dog clear of the teeth of the ratchet wheel when the push bar is at the limit of its upward movement. The pins 9 pivotally connecting the fork members of the push bar 6 with the links 7 extend inwardly to form stops to engage side members of a lever 10, which is mounted upon the axle 3. A spring 11 normally exerts an upward pressure upon the push bar to hold the same elevated, the spring being of such tension as to overcome the pressure of the spring normally tending to hold the dog 5 in engagement with the teeth of the ratchet wheel 4.

The lever 10 usually consists of a bar doubled upon itself and has end portions of its side members extending beyond the axle 3 to admit of connection therewith of helical springs 12, which are of the contractile type and have their ends secured to extensions of the fork members of the bracket 2. The springs 12 hold the lever 10 in a given position. A dog 13 is pivotally connected to the outer end of the lever 10 and is adapted to engage the teeth of the ratchet wheel 4 so as to advance said ratchet wheel when the push bar 6 is depressed. A release or trip device 14 is secured at one end to the base 1 and has its opposite end extending within the path of the dog 13 to normally hold it clear of the teeth of the ratchet wheel 4 so that the ratchet wheel may occupy a predetermined position. The active end of the release or trip device 14 is curved or otherwise formed to provide a cam upon which the dog 13 rides so as to effect disengagement of said dog from the teeth of the ratchet wheel 4 when the lever 10 returns to the predetermined position after being actuated.

The rod or connection leading to the valve of the carbureter is indicated at 15 and is joined to the ratchet wheel 4. In order that the accelerator mechanism may be adapted for different makes of cars and types of carbureters it is preferred to have the rod 15 adjustably connected to the ratchet wheel 4 and for this purpose a clamp 16 is had, the rod 15 having pivotal connection with the clamp 16 and the latter adapted to make adjustable connection with the ratchet wheel 4. As indicated the ratchet wheel embodies spokes and the clamp 16 is secured to one of the spokes in the required position.

When the parts are in normal position the push bar 6 is elevated and the dogs 5 and 13 are held clear of the teeth of the ratchet wheel 4. When it is required to bring the accelerator into service the push bar 6 is depressed, thereby bringing the projecting ends of the pins 9 in engagement with the members of the lever 10 and depressing the outer end of said lever and moving the dog 13 downward. As the dog 13 clears the release or trip device 14 it engages a tooth of the ratchet wheel 4 and turns the latter and moves the rod 15, thereby opening the throttle of the carbureter. As the push bar 6 is depressed the stop 8 is withdrawn from the free end of the dog 5 and the latter moving downward engages the teeth of the ratchet wheel and prevents backward rotation thereof. The movement of the push bar is comparatively slight, hence at the first operation the throttle valve of the carbureter is open but slightly, thereby enabling the operator to rest the foot squarely upon the floor of the machine. Should it be required to open the throttle to a greater extent pressure upon the push bar is relaxed, thereby permitting the push bar to rise, but it is necessary to limit the movement so as to prevent the stop 8 engaging the dog 5 and releasing the same from the teeth of the ratchet wheel. As the push bar rises the outer end of the lever 10 correspondingly moves upward and returns the dog 13 to a new position, the ratchet wheel being prevented from following the dog 13 backward by reason of the dog 5 engaging the teeth thereon. The push bar is a second time depressed when the dog 13 engaging with the ratchet wheel again moves the same forward, thereby opening the throttle to a greater extent. This operation may be repeated as often as necessary until the throttle is opened to the required extent, it being understood that at each operation of the push bar the foot of the operator is enabled to rest squarely upon the floor of the machine. To prevent turning the ratchet wheel forwardly too far a portion of the teeth is cut away, as indicated at 17, and when this part reaches the dog 5 it is practically impossible to move the ratchet wheel forward to any greater extent. When it is required to restore the parts to normal position pressure is entirely removed fom the push bar to admit of the same moving upwardly to the limit of its throw, thereby bringing the stop 8 in engagement with the dog 5 which is disengaged from the teeth of the ratchet wheel and at the same time the dog 13 is caused to clear the teeth of the ratchet wheel by means of the release or trip device 14 in the manner stated. The ratchet wheel being free is returned to normal position by the spring employed in connection with the throttle of the carbureter or by other suitable means, as will be readily understood. As shown a spring 18 is connected at one end to the rod 15 and its opposite end may be attached to any convenient part of the machine.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

It is noted that the axle 3 being fixed to the wheel 4 to rotate therewith freely in the bracket 2, lever 10 and link 7 prevents rattle of the parts, when the car is in motion, by the action of the springs 12 pulling upon the projecting ends of the bracket 2 and lever 10. This arrangement also prevents abrupt backward rotation of the wheel 4 when released.

It is also noted that when pressure is released on the push bar and the latter permitted to return until the lever 10 engages with the part 14 the operator will experience a seemingly somewhat sudden pause at which instant the push bar is again depressed, if the accelerator is to be opened to a further extent, otherwise the lever 10 and push bar are permitted to return to the full limit of their movement to trip the dogs and release the ratchet wheel in the manner stated.

Having thus described the invention what is claimed as new, is:—

1. In an accelerator for the throttle of explosive engines, the combination of a ratchet member adapted to have connection with the said throttle, an operating member provided with a dog to engage the teeth of the ratchet member to move the same forward, a second dog arranged to engage the teeth of the ratchet member to prevent backward movement when the operating member is returning to enable the dog carried thereby to obtain engagement with a new tooth, a trip for disengaging the dog of the operating member from the ratchet member, and actuating means for the operating member provided with means to trip the second dog and release the ratchet member when the actuating means returns to normal position.

2. In an accelerator for the throttle of explosive engines, the combination of a ratchet member adapted to have connection with the throttle, a lever, a dog carried by said lever and adapted to engage the teeth of the ratchet member, a trip adapted to engage said dog and hold it clear of the teeth of the ratchet member, a pressure bar adapted to operate the said lever, a dog for engaging the teeth of the ratchet member to prevent backward rotation thereof when the said lever is returning to normal position, and a stop upon the pressure bar to engage with the detaining dog to hold the same clear of the teeth of the ratchet member when the parts are in normal position.

3. In an accelerator, the combination of a ratchet member, a lever, a dog carried by the lever and adapted to engage the teeth of the ratchet member, a trip for normally holding said dog clear of the teeth of the ratchet member, a push bar for operating said lever, a dog adapted to engage the teeth of the ratchet member for preventing backward rotation thereof, and a stop upon the push bar for engaging the last mentioned dog to normally hold it clear of the teeth of the ratchet member.

4. In an accelerator, the combination of a ratchet wheel, a lever mounted in line with the axis of the ratchet wheel, a dog carried by said lever and adapted to engage the teeth of the ratchet wheel, a trip for normally holding the dog clear of the teeth of the ratchet wheel, a push bar, a link, a pin pivotally connecting the push bar with the link and having a part projecting to form a stop to engage said lever, a dog for preventing backward rotation of the ratchet wheel, and a stop carried by the push bar and normally engaging the last mentioned dog to hold it clear of the teeth of the ratchet wheel.

5. In an accelerator, the combination of a ratchet wheel, means for connecting the ratchet wheel to the throttle, a lever mounted in line with the ratchet wheel, a dog carried by said lever and adapted to engage the teeth of the ratchet wheel, a trip for normally holding said dog clear of the teeth of the ratchet wheel, a push bar, a link mounted in line with the ratchet wheel and lever, a pin connecting the push bar with the link and having a portion projecting to engage the said lever, a dog for engaging the teeth of the ratchet wheel to prevent backward rotation thereof, and a stop carried by the push bar to engage the last mentioned dog to normally hold it clear of the ratchet wheel.

In testimony whereof I affix my signature in presence of two witnesses.

THOMAS C. WILLETT.

Witnesses:
J. E. WINTERS,
W. R. EDWARD.